(12) United States Patent
Contreras et al.

(10) Patent No.: US 8,387,176 B2
(45) Date of Patent: Mar. 5, 2013

(54) MOTORIZED MECHANISM FOR EXTENDING A SOFA SLEEPER FROM A SITTING POSITION TO A RECLINING POSITION

(75) Inventors: John A. Contreras, Redondo Beach, CA (US); Michael A. Galardo, Newport Beach, CA (US)

(73) Assignee: Elite Leather Company, Chino, CA (US)

( * ) Notice: Subject to any disclaimer, the term of this patent is extended or adjusted under 35 U.S.C. 154(b) by 262 days.

(21) Appl. No.: 12/766,499

(22) Filed: Apr. 23, 2010

(65) Prior Publication Data

US 2011/0258773 A1 Oct. 27, 2011

(51) Int. Cl.
*A47C 17/04* (2006.01)
(52) U.S. Cl. .................................... 5/41; 5/18.1; 5/44.1
(58) Field of Classification Search .................. 5/13, 16, 5/17, 18.1, 19, 20, 37.1, 39, 41, 42, 42.1, 5/43, 44.1, 47
See application file for complete search history.

(56) References Cited

U.S. PATENT DOCUMENTS

| | | | |
|---|---|---|---|
| 2,730,727 A * | 1/1956 | Schneller | 5/38 |
| 2,834,969 A | 5/1958 | Wachsman | |
| 2,972,753 A | 2/1961 | Thomas | |
| 3,005,998 A * | 10/1961 | Zimmerspitz | 5/44.1 |
| 3,056,973 A | 10/1962 | Keller et al. | |
| 3,248,742 A | 5/1966 | Johnson | |
| 3,458,877 A | 8/1969 | Edwards | |
| 4,321,716 A | 3/1982 | Shrock | |
| 4,612,677 A | 9/1986 | Crosett | |
| 4,625,345 A | 12/1986 | Wood | |
| 5,038,423 A | 8/1991 | Hall | |
| 5,517,706 A | 5/1996 | Kashima et al. | |
| 5,788,329 A * | 8/1998 | Pilarczyk et al. | 297/354.13 |
| 5,927,144 A | 7/1999 | Koch | |
| 6,185,764 B1 | 2/2001 | Merritt | |
| 2006/0096027 A1 | 5/2006 | Thurow | |
| 2008/0185887 A1 | 8/2008 | Merensky | |
| 2009/0146474 A1 | 6/2009 | Welles et al. | |

* cited by examiner

*Primary Examiner* — Robert G Santos
*Assistant Examiner* — Nicholas Polito
(74) *Attorney, Agent, or Firm* — Gordon & Rees LLP

(57) ABSTRACT

A rotational mechanism for extending a sofa sleeper from an upright sitting position to a fully reclining and fully extended sleep position, having: a first rotatable member configured to rotate about a first axis; a second rotatable member configured to rotate about a second axis; a link mechanism attached to both the first and second rotatable members, the link mechanism being moveable along a length of both of the first and second rotatable members; and a drive mechanism configured to position the moveable link at positions along the length of at least one of the rotatable members such that movement of the link mechanism causes both the first and second rotatable mechanisms to rotate.

11 Claims, 6 Drawing Sheets

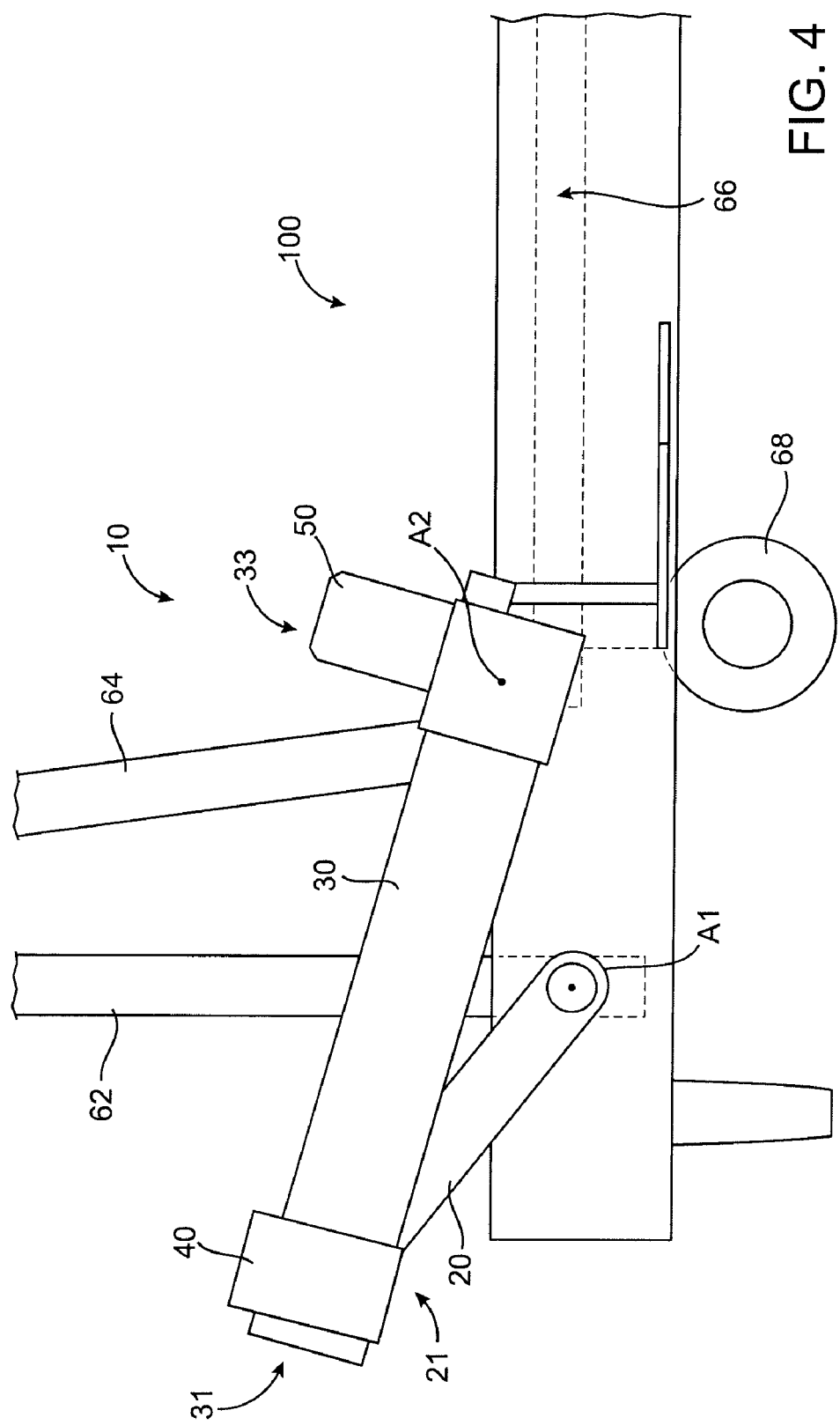

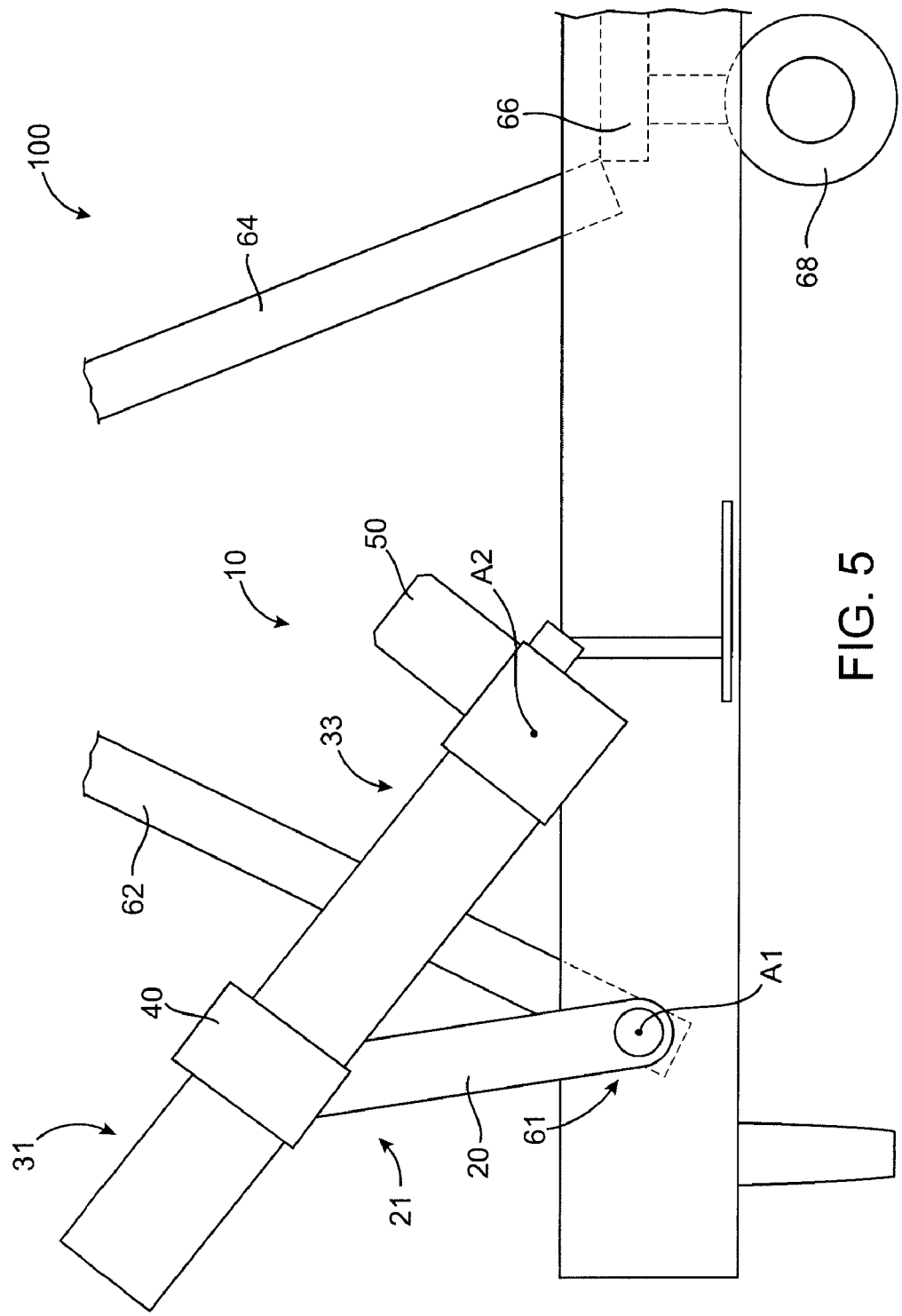

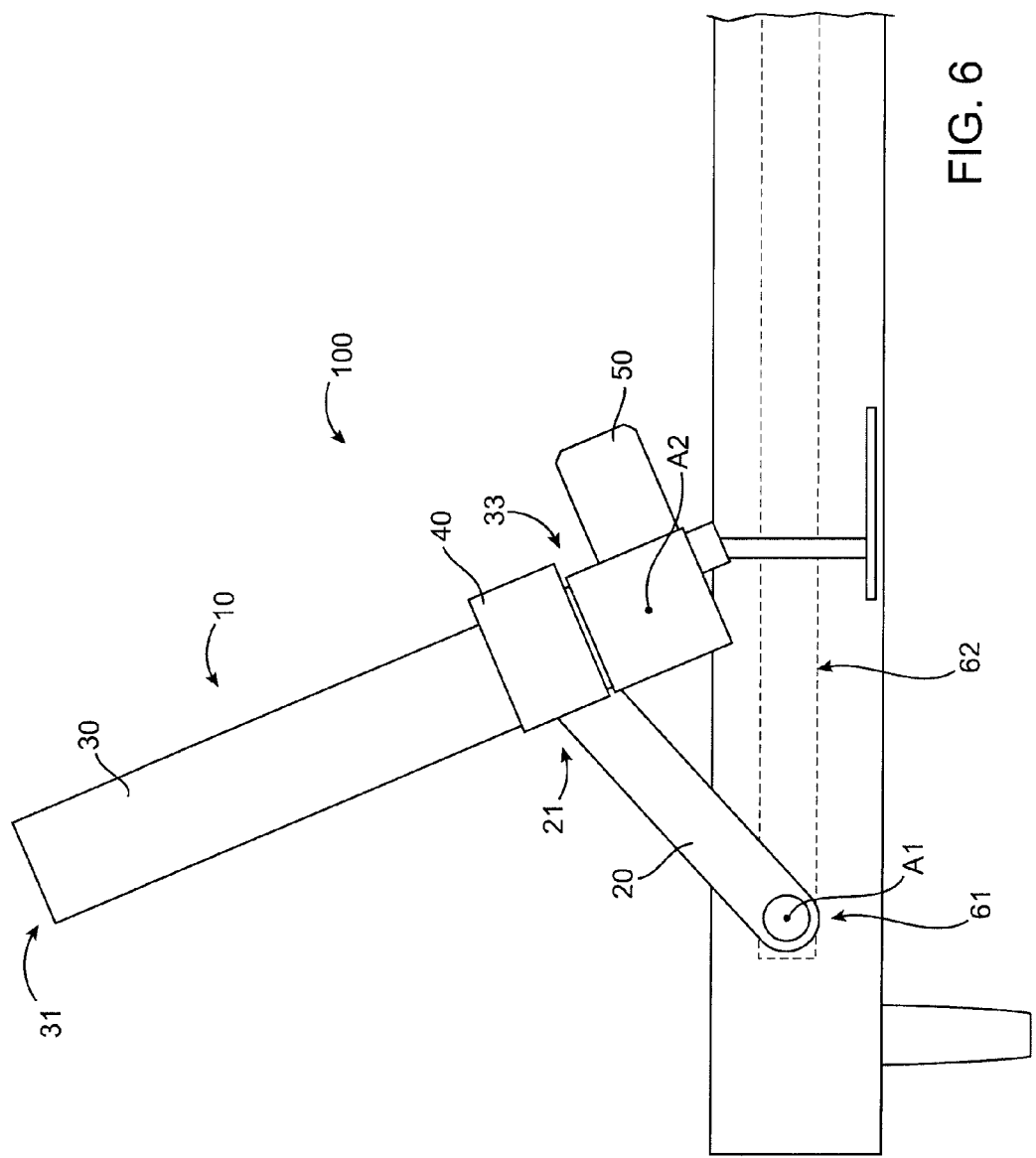

MOTORIZED MECHANISM FOR EXTENDING A SOFA SLEEPER FROM A SITTING POSITION TO A RECLINING POSITION

TECHNICAL FIELD

The present invention relates to sofa sleepers that can be moved between upright sitting positions and fully reclining sleeping positions.

SUMMARY OF THE INVENTION

The present invention provides a rotational mechanism for moving a sofa sleeper between an upright sitting position and a fully reclining and fully extended sleep position. This rotational mechanism is motorized such that the sofa sleeper position can be changed at the press of a button.

In preferred embodiments, the present invention comprises: a first rotatable member configured to rotate about a first axis; a second rotatable member configured to rotate about a second axis; a link mechanism attached to both the first and second rotatable members, wherein the link mechanism is attached to a distal end of the first rotatable member and is moveable along a length of the second rotatable member; and a drive mechanism configured to position the moveable link at positions along the length of the second rotatable member such that movement of the link mechanism causes both the first and second rotatable mechanisms to rotate.

In preferred embodiments, a folding mattress support frame is included, and the first rotatable member is connected to the folding mattress support frame such that rotation of the first rotatable member moves the folding mattress support frame back and forth between its folded sitting position and its unfolded reclining and fully extended sleep position.

In various preferred embodiments, the folding mattress support frame comprises three sections pivotally connected together end-to-end. The first and second sections rotate (in opposite directions) between the upright sitting and fully reclining and fully extended sleep positions. The third section has support wheels underneath and simply moves back and forth (in and out of the sleeper), while remaining parallel to the floor.

In preferred embodiments, the drive mechanism comprises a motor that turns a positioning element, with the positioning element moving the link mechanism back and forth along the second rotatable member The present invention has numerous advantages over current systems. First, its drive mechanism includes a motor that moves a pull-out sleeper between its upright sitting and its fully reclining fully extended sleep positions at the press of a button. Second, the present mechanism is designed such that one rotatable member acts as a lever to the other. As a result, when the motor moves a link mechanism on one rotatable member, this member acts as a lever causing the other member to rotate (which in turn causes the sleeper to move in or out to its new position).

Thus, a small amount of rotation of the second rotational member causes a correspondingly large amount of rotation of the first rotational member (and thus a correspondingly large amount of movement of the foldable sleeper frame itself). As a result of this member-to-member lever effect, the motor used in the present invention doesn't need to be powerful enough to directly turn the rotatable member connected directly to the folding mattress support frame. Instead, the present motor only needs to be strong enough to move the link mechanism linearly along the second rotatable member. As a result, the motor/device can be small and compact (and can be positioned within an arm frame of the sofa sleeper). In addition, the present motor need not rotate the mattress frame directly. Rather, only a simple longitudinal movement of the link mechanism back and forth in a straight line along the second rotatable member is all that is required. This results in a simple design that reduces demands on the motor.

BRIEF DESCRIPTION OF THE DRAWINGS

FIG. 4 is a side elevation close-up view of the rotational mechanism with the sofa sleeper in its folded sitting position.

FIG. 5 is a side elevation close-up view of the rotational mechanism with the sofa sleeper moving between positions.

FIG. 6 is a side elevation close-up view of the rotational mechanism with the sofa sleeper in its unfolded reclining and fully extended sleep position.

DETAILED DESCRIPTION OF THE DRAWINGS

Figure 2:
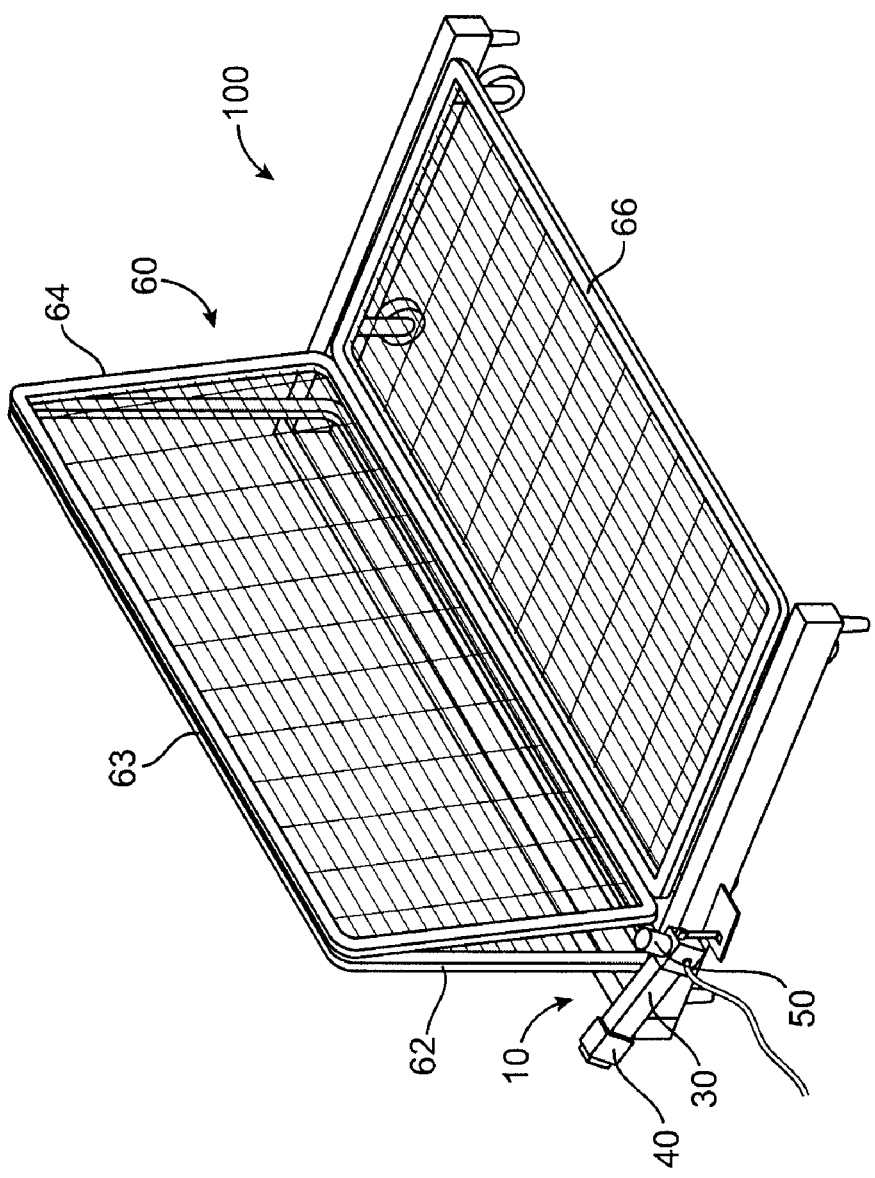
FIG. 2 is a schematic perspective view of the sofa sleeper mattress frame in a folded sitting position.
Figure 3:
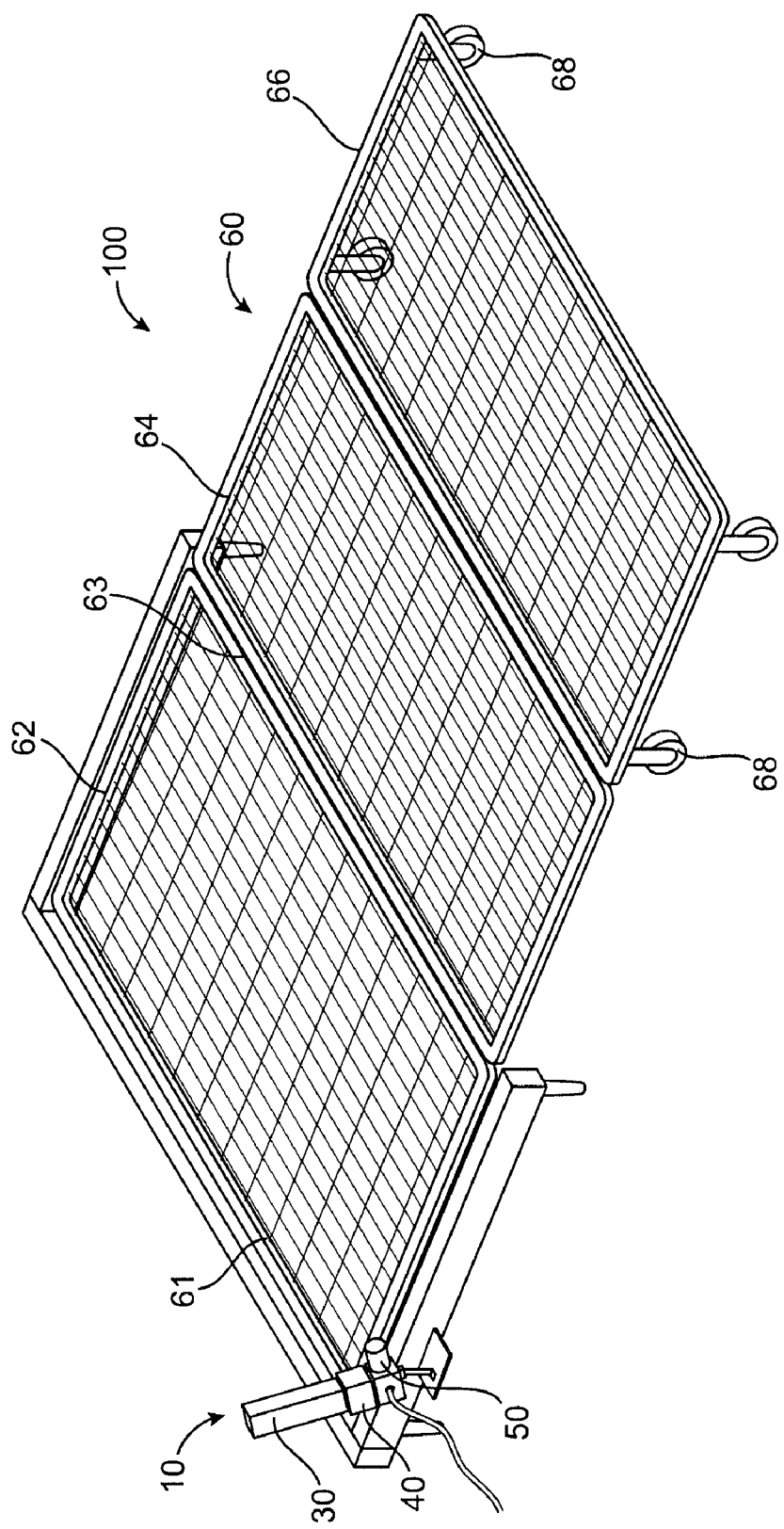
FIG. 3 is a schematic perspective view of the sofa sleeper in an unfolded reclining and fully extended sleep position.

The present invention provides a system for moving a sofa sleeper back and forth between its folded sitting position and its unfolded reclining and fully extended sleep position. Specifically, FIGS. 2 and 4 show a sofa sleeper in a folded sitting position, and FIGS. 3 and 6 show the sofa sleeper in an unfolded reclining position. FIG. 5 shows the sofa parts half way between the folded and unfolded positions.

Although the present invention is ideally suited for use with a sofa sleeper, it is to be understood that this invention may also be used with any other sort of reclining furniture, including, but not limited to sectionals, loveseats, chairs, or any other upholstery group that may use a sleeper.

Referring to the Figures, the present invention provides a rotational mechanism 10 for extending a furniture piece (e.g.: sofa 100), as follows. A first rotatable member 20 is configured to rotate about a first axis A1. A second rotatable member 30 is configured to rotate about a second axis A2. A link mechanism 40 is attached to both the first and second rotatable members 20 and 30, as follows. The link mechanism 40 is connected to a distal end 21 of first rotatable member 20. Thus, link mechanism 40 remains adjacent to the distal end of first rotatable member 20 as it is rotated about axis A1. In addition, link mechanism 40 is slidably connected to second rotatable member 30. Thus, link mechanism 40 slides up and down second rotatable member 30 as it is rotated about axis A2. A drive mechanism 50 is also included. Drive mechanism 50 is configured to position moveable link 40 at different positions along the length of second rotatable member 30. As a result, movement of link mechanism 40 (along second rotatable member 30) causes both the first and second rotatable members 20 and 30 to rotate. Specifically, (as shown in FIGS. 2 and 4) when link mechanism 40 is moved to the distal end 31 of rotatable second member 30, then sofa sleeper 100 will be in its folded sitting position. Conversely, (as shown in FIGS. 3 and 6) when link mechanism 40 is moved to the proximal end 33 of rotatable second member 30, then sofa sleeper 100 will be in its unfolded reclining position.

Further details of link mechanism 40 are seen in the close up views of FIGS. 4, 5 and 6. Link mechanism 40 may simply be a collar that slides along grooves in second rotatable member 30. Drive mechanism 50 preferably comprises a motor 52 and a positioning element 54 that moves carriage 40 along second rotatable member 30. In optional preferred embodiments, positioning element 54 is a rotating screw positioned within rotatable member 30. This screw is mechanically connected to link mechanism 40. As a result, rotation of the screw causes link mechanism 40 to move up and down the length of second rotatable member 30 as desired. It is to be understood, however, that the present invention is not so limited. Other systems of moving link mechanism 40 along second rotatable member 30 are also contemplated within the scope of the present invention.

As can be seen by comparing FIG. 2 to FIG. 3, the first rotatable member 20 rotates through a greater angle (about axis A1) than second rotatable member 30 rotates (about axis A2) as the link mechanism 40 moves up and down along the length of second rotatable member 30. This provides a "lever effect" with a small angular movement of second rotatable member 30 directly translating into a much larger angular movement of first rotatable member 20. This same lever effect is also seen by comparing FIGS. 4 to 6. Specifically, first rotatable member 20 rotates from a "10 o'clock position" (FIG. 4) through to a "2 o'clock position" (FIG. 6). At the same time, second lever arm 30 only rotates from a "9:30 position" (FIG. 4) through to an "11 o'clock position" (FIG. 6). Thus, the advantage of the present invention is that motor 50 need only move second rotational member 30 a few degrees while second rotational member 30 acts as a "lever" on first rotational member 20 (causing first rotational member 20 to rotate farther). The comparatively large rotation of first rotational member 20 can be used to fully extend (or retract) sofa 100, as follows.

The present invention also includes a folding mattress support frame 60. First rotatable member 20 is connected directly to folding mattress support frame 60 such that rotation of first rotatable member 20 moves folding mattress support frame 60 from a folded sitting position (FIGS. 2 and 4) to the unfolded reclining position (FIGS. 3 and 6).

Specifically, folding mattress support frame 60 comprises three sections 62, 64, and 66 pivotally connected together end-to-end, as follows. A first section 62 is pivotally connected to the first rotatable member 20, and thus end 61 of first section 62 rotates together with first rotatable member 20 about first axis A1. A second section 64 is pivotally connected to first section 62, and the third section 66 is pivotally connected to second section 64. Support wheels 68 are positioned underneath third section 66.

As can be seen, the first and second sections 62 and 64 rotate in opposite directions when moving between the sofa sleeper's folded sitting position (FIGS. 2 and 4) and its unfolded and sully reclining sleep position (FIGS. 3 and 6). Thus, a pivot connection point 63 (between the first and second sections 62 and 64) is raised when the folding mattress support frame 60 is in the folded sitting position. Conversely, connection point 63 is lowered when the folding mattress support frame 60 is in the unfolded reclining position (FIGS. 3 and 6). As can also be seen, the third section 66 simply moves parallel to the floor and does not rotate at all when moving between the sofa sleeper's folded sitting position and the unfolded reclining positions.

Figure 1:
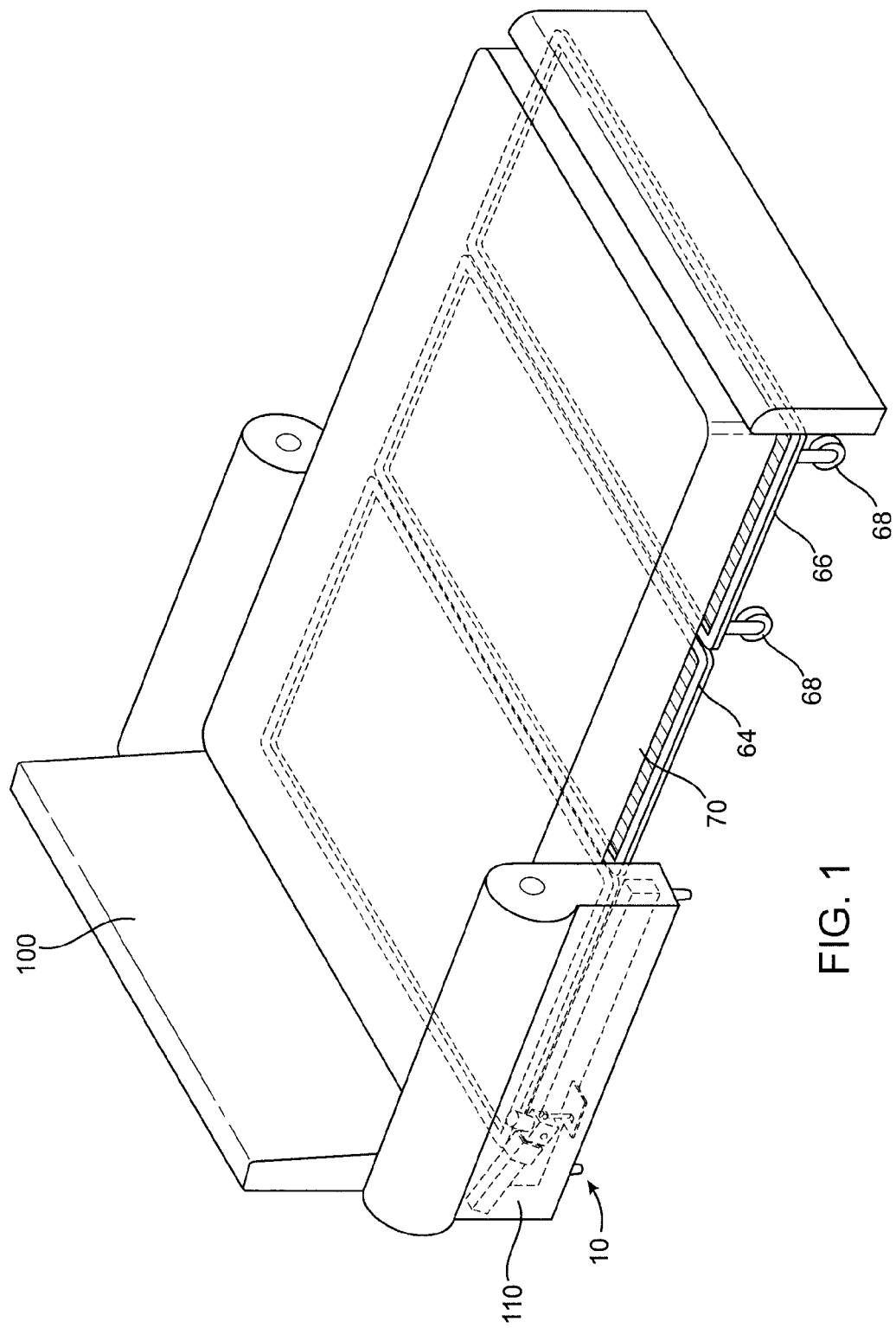
FIG. 1 is a perspective view of the present invention (with hidden components shown in dotted lines).

FIG. 1 shows the present rotational mechanism 10 in use in a sofa 100. In this embodiment, rotational mechanism 10 is disposed within an arm 110 of sofa 100 and is thus hidden from view. An inflatable mattress 70 is disposed on top of folding mattress support frame 60. In accordance with the present invention, mattress 70 may preferably have separate inflatable sections. It is to be understood, however, that the present invention also encompasses embodiments in which the entire mattress is inflatable or even embodiments in which the mattress is not inflatable but is merely thinner and foldable.

What is claimed is:

1. A rotational mechanism for extending a furniture piece, comprising:
    a first rotatable member configured to rotate about a first axis;
    a second rotatable member configured to rotate about a second axis;
    a link mechanism attached to both the first and second rotatable members, wherein the link mechanism is moveable along a length of the second rotatable member;
    a drive mechanism configured to position the moveable link at positions along the length of the second rotatable member such that movement of the link mechanism causes both the first and second rotatable mechanisms to rotate; and
    a folding mattress support frame, wherein the first rotatable member is connected to the folding mattress support frame such that rotation of the first rotatable member moves the folding mattress su ort frame from a folded sitting position to an unfolded reclining and fully extended sleep position, and
    wherein the folding mattress support frame comprises three sections pivotally connected together end-to-end, being:
        a first section connected to the first rotatable member which rotates with the first rotatable member about the first axis,
        a second section pivotally connected to the first section,
        a third section pivotally connected to the second section, and support wheels positioned underneath the third section, and
    wherein the first section is locked at a fixed acute angle to the first rotatable member.

2. The rotational mechanism of claim 1, wherein the link mechanism is attached to a distal end of the first rotatable member.

3. The rotational mechanism of claim 1, wherein the first rotatable member rotates through a greater angle than the second rotatable member as the link mechanism moves along the length of the second rotatable member.

4. The rotational mechanism of claim 1, wherein the first and second sections rotate in opposite directions when moving between the folded sitting position and the unfolded reclining and fully extended sleep position.

5. The rotational mechanism of claim 1, wherein a connection point between the first and second sections is raised when the folding mattress support frame is in the folded sitting position.

6. The rotational mechanism of claim 1, wherein a connection point between the first and second sections is lowered when the folding mattress support frame is in the unfolded reclining and fully extended sleep position.

7. The rotational mechanism of claim 1, wherein the third section moves parallel to the floor and does not rotate when moving between the folded sitting position and the unfolded reclining and fully extended sleep position.

8. The rotational mechanism of claim 1, further comprising:
    a folding mattress positioned on top of the folding mattress support frame.

9. The rotational mechanism of claim 1, wherein the furniture piece is a sofa sleeper.

10. The rotational mechanism of claim 1, wherein the drive mechanism comprises:
   a positioning element for moving the link mechanism along the length of the second rotatable member; and
   a motor for moving the positioning element.

11. The rotational mechanism of claim 10, wherein the positioning element is a rotating screw disposed inside the second rotational member.

* * * * *